United States Patent Office 3,038,004
Patented June 5, 1962

3,038,004
QUATERNARY AMMONIUM COMPOUNDS
Frederick Charles Copp and Douglas Stephenson, London, England, assignors to Burroughs Wellcome & Co. (U.S.A.) Inc., Tuckahoe, N.Y., a corporation of New York
No Drawing. Filed June 28, 1960, Ser. No. 39,203
Claims priority, application Great Britain Apr. 18, 1958
3 Claims. (Cl. 260—501)

The present invention relates to quaternary ammonium salts and to the preparation thereof, and is a continuation-in-part of the invention described and claimed in co-pending U.S. application No. 806,488, filed Apr. 15, 1959.

It has been found that quaternary ammonium salts containing the N-o-bromobenzyl-N-ethyl-N,N-dimethylammonium cation are effective antiadrenergic agents. The anion equivalent associated with the cation may be any pharmacologically and pharmaceutically acceptable non-toxic anion equivalent, for example a chloride, bromide, methylsulphate, sulphate, p-toluenesulphonate or embonate equivalent.

It has been shown that salts containing the cation have a highly selective blocking effect on the peripheral sympathetic nervous system: for example they prevented the relaxation of the rabbit ileum caused by stimulating its adrenergic nerve supply; and when they were injected into cats, a reduction of sympathetic tone was indicated by a long-lasting relaxation of the nictitating membranes. This blocking effect occurred at doses well below the toxic dose levels and was not accompanied by any effects other than those on the sympathetic nervous system. In particular the salts did not cause mydriasis nor any other impairment of parasympathetic functions as do ganglion blocking agents, and did not cause central depression as does reserpine. These properties render the salts useful for the reduction of sympathetic tone, for example in the treatment of hypertension.

The selective blocking effect has been shown, using the bromide as a representative example of this type of salt to involve the selective accumulation of the salt in adrenergic nerves. The bromide, which was labelled in one of its methyl groups with $C^{14}$, was injected into cats at a dose level sufficient to release the nictitating membranes for 24 hours. The level of radioactivity indicated that the concentrations of the salt in adrenergic nerves far exceeded those in other tissues. When applied topically in such concentrations to adrenergic nerves in a number of in vitro and in vivo preparations, transmission was blocked. In cats the salt lowered the blood pressure, particularly when the animal was in a vertical position, and blocked the cardioaccelerans nerve; it also prevented the contraction of the nictitating membranes caused by stimulation of either the pre- or post-ganglionic cervical sympathetic nerve, which indicated that its side of action is peripheral to the ganglion. It prevented the vasoconstriction of the perfused rabbit ear caused by stimulation of the greater auricular nerve and the contraction of the rabbit uterus elicited through the hypogastric nerve. It did not impair the function of the adrenal medulla in so far as it did not prevent the pressor effect of splanchnic nerve stimulation in the cat and did not deplete the catechol amine content of the tissues of the cat and rat as does reserpine.

In clinical trials, the bromide and p-toluenesulphonate have been used successfully for the treatement of hypertension, effectively controlling the blood pressure of patients without causing the side effects associated with other hypotensive agents. The p-toluenesulphonate is now in general use in medicine. The dose range suitable for the administration of these and other salts containing the cation is from 20 mg. to 1.5 mg. For continuous medication dosing two or three times a day is usually desirable.

The present invention, therefore, provides therapeutically acceptable salts consisting of the N-o-bromobenzyl-N-ethyl-N,N-dimethylammonium cation and a pharmacologically and pharmaceutically acceptable non-toxic anion equivalent.

The salts of the N-o-bromobenzyl-N-ethyl-N,N-dimethylammonium cation may be prepared by a quaternisation reaction, that is, by the reaction of a tertiary amine containing three of the four groups desired in the ammonium cation with a reactive derivative of the group it is desired to introduce. For example, they may be prepared by reacting N-ethyl-N,N-dimethylamine with a benzylating agent such as o-bromobenzyl chloride, bromide or iodide or an o-bromobenzyl sulphonic ester, optionally in the presence of a solvent such as acetone, ethylmethylketone or isopropanol. Further, they may be prepared by reacting N-o-bromobenzyl-N,N-dimethylamine with an ethylating agent such as ethyl iodide or p - toluenesulphonate, or N - o - bromobenzyl - N - ethyl-N-methylamine or N-o-bromobenzyl-N-ethylamine with a methylating agent such as methyl iodide, dimethyl sulphate or methyl p-toluenesulphonate; these reactions are effected optionally in a solvent such as acetone, ethylmethylketone, ethyl acetate or methanol, and it is often preferable to use rather more than the theoretically required molecular proportion of the ethylating or methylating agent to obtain good yields. The salt of the N-o-bromobenzyl - N - ethyl - N,N - dimethylammonium cation produced by these reactions may be converted by double decomposition, either during or after the described reactions, for example in solution or on an ion exchange column, into the salt of another anion.

The salts of the N-o-bromobenzyl-N-ethyl-N,N-dimethylammonium cation may be presented in pharmaceutical preparations prepared by any of the well-known methods of pharmacy. For oral administration, fine powders or granules of the salt may contain diluents and dispersing and surface active agents, and may be presented in a draft in water or in a syrup, in capsules or cachets in the dry state or in a non-aqueous suspension, when a suspending agent may be included; in tablets, when binders and lubricants may be included; or in a suspension in water or a syrup or an oil, or in a water/oil emulsion, when flavouring, preserving, suspending, thickening and emulsifying agents may be included. The granules or the tablets may be coated. For parenteral administration, the salt may be presented in aqueous injection solutions which may contain antioxidants, buffers, bacteriostats, agents which solubilise a relatively insoluble salt, and solutes which render the salts isotonic with the blood; in aqueous suspensions when suspending agents and thickening agents may be included; or in non-aqueous solutions and suspensions if the compound is affected by water. Extemporaneous injection solutions may be prepared from sterile pills, granules or tablets which may contain diluents, dispersing and surface active agents, binders and lubricants. The salts may also be presented in suppositories or pessaries by incorporation in a suppository base.

The invention will now be described by reference to the following examples, in which all temperatures are given in degrees centigrade.

*Example 1* o-Bromobenzyl bromide (20 g.) was added slowly to methanolic dimethylamine (50% w./w.; 70 ml.) with cooling to keep the temperature at 10–20°. After 24 hours the mixture was evaporated on a steam-bath and excess aqueous 5 N-sodium hydroxide was added to the cooled residue. The resulting N-o-bromobenzyl-N,N-dimethylamine was extracted with ether. The ethereal extract was dried over solid potassium hydroxide, filtered and evaporated, and the residue was distilled in vacuo, boiling point 108–112°/20 mm.

A solution of this base (5 g.) and ethyl iodide (4.5 g.) in acetone (15 ml.) was heated to reflux for 30 minutes. Addition of ether or ethyl acetate to the cooled reaction mixture gave N-o-bromobenzyl-N-ethyl-N,N-dimethylammonium iodide which was recrystallized from acetone and ethyl acetate or from isopropanol, melting point 116–117°, with softening at 114°.

*Example 2* o-Bromobenzyl bromide (25 g.) was added slowly to a cooled solution of N-ethyl-N-methylamine (12 g.) in methanol (20 ml.). After 48 hours, the mixture was evaporated on a steam-bath and excess aqueous 5 N-sodium hydroxide added. The resulting N-o-bromobenzyl-N-ethyl-N-methylamine was extracted with ether. The extract was dried over solid potassium hydroxide, filtered and evaporated, and the residue was distilled in vacuo, boiling point 120–122°/20mm.

Methyl iodide (3.5 g.) was added to a solution of this base (4.5 g.) in ethyl acetate (40 ml.). N-o-bromobenzyl-N-ethyl-N,N-dimethylammonium iodide rapidly crystallised from the mixture. It was filtered off and recrystallised from isopropanol, melting point 116–117°, after softening at 114°, and was identical with the product from Example 1.

*Example 3* o-Bromobenzyl iodide (3 g.) was added slowly to a solution of N-ethyl-N,N-dimethylamine (0.9 g.) in acetone (5 ml.) with cooling. A clear solution formed which subsequently crystallised. After 24 hours the resulting N-o-bromobenzyl-N-ethyl-N,N-dimethylammonium iodide was filtered off and recrystallised from isopropanol, melting point 117–118°, after softening at 114°. It was identical with the product from Examples 1 and 2.

*Example 4* o-Bromobenzyl bromide (25 g.) was added slowly to a cooled solution of N-ethyl-N,N-dimethylamine (8.0 g.) in acetone (40 ml.). Reaction took place with the separation of a crystalline solid. After 96 hours the mixture was heated to reflux for 1 hour, cooled, and the solid N-o-bromobenzyl-N-ethyl-N,N-dimethylammonium bromide filtered off and recrystallised from isopropanol and ethyl acetate, melting point 164–165°.

*Example 5*

A solution of ethyl p-toluenesulphonate (4.4 g.) and N-o-bromobenzyl-N,N-dimethylamine (4.3 g.) in ethylmethyl ketone (10 ml.) was heated to reflux for 2 hours. Ether (2 ml.) was added to the cooled solution, when a crystalline solid rapidly separated. This was filtered off and recrystallised by precipitation from acetone with ethyl acetate and a little ether. The resulting N-o-bromobenzyl-N-ethyl-N,N-dimethylammonium p-toluenesulphonate had a marked tendency to crystallise with varying amounts of water of crystallisation, but prolonged drying at 60° in vacuo gave an anhydrous product, melting point 85–86°.

Alternatively, drying for 24 hours in vacuo at room temperature gave a monohydrate, melting point 78–79°

*Example 6*

Finely divided sodium hydride (2.4 g., as 50% dispersion in mineral oil) was added to a solution of o-bromobenzyl alcohol (19.3 g.) in dry ether (100 ml.). The resulting mixture was stirred at room temperature for 16 hours and then heated to reflux for 4 hours. The suspension thus formed was cooled to about −20°, stirred and treated slowly with a solution of p-toluenesulphonyl chloride (19.5 g.) in dry ether (100 ml.). The final mixture was kept overnight at 0° and then warmed to room temperature for 30 minutes. The separated inorganic material was filtered off, using a dry sintered glass funnel, and the filtrate was evaporated in vacuo until a solid began to separate. After standing overnight at 0°, the o-bromobenzyl p-toluene sulphonate was filtered off and dried in vacuo, melting point 92°.

This sulphonic ester (9.8 g.) and N-ethyl-N,N-dimethylamine (2 g.) were mixed together in ethylmethyl ketone (20 ml.). After standing for 10 minutes, the resulting solution was heated to reflux for 30 minutes, cooled, and treated with ether to precipitate N-o-bromobenzyl-N-ethyl - N,N - dimethylammonium p-toluenesulphonate, melting point 73°. It was repeatedly recrystallised by precipitation from acetone with ether and finally dried at 60° in vacuo when it had melting point 86°. It was identical with the (anhydrous) material described in Example 5.

*Example 7*

A solution of disodium embonate (1.1 g.) in hot water (15 ml.) was added to a solution of N-o-bromobenzyl-N-ethyl-N,N-dimethylammonium iodide (1.85 g.) in water (5 ml.). An oil separated. This was coagulated by centrifuging; the supernatant liquors were sucked off, and the residue was washed with fresh water. More water (10 ml.) was added to the final residue of di-(N-o-bromobenzyl - N - ethyl - N,N - dimethylammonium) embonate, together with 2 N-sulphuric acid (2.5 ml.). Embonic acid was precipitated and filtered off. The filtrate had pH 4 and so a little barium carbonate was added with shaking until the pH was between 5 and 6. The suspension was refiltered and the filtrate was evaporated to dryness in vacuo. The residual gum was ground up with acetone containing 5% isopropanol to give di-(N-o-bromobenzyl-N-ethyl-N,N - dimethylammonium)sulphate as a crystalline solid, melting point 98–100°. It was very deliquescent.

*Example 8*

N-o-bromobenzyl-N,N-dimethylamine (100 gms.) and ethyl p-toluenesulphonate (94 gms.) were mixed and warmed to 50–60°; after standing for either (a) a minimum of 96 hours at 15–20° or (b) a minimum of 18 hours at 50–60° and cooling to room temperature, a hard, crystalline mass was formed. Recrystallization of this product from acetone (2.0 mls. per gm. of crude solid), followed by filtration and drying to 60° gave N-o-bromobenzyl-N-ethyl-N,N-dimethylammonium p-toluenesulphonate as a white, crystalline solid, melting point 97–99°. For this procedure it was necessary that the reactants were substantially colourless and of a high purity.

*Example 9*

N-o-bromobenzyl-N,N-dimethylamine (250 kgm.) and ethyl-p-toluenesulphonate (250 kgm.) were dissolved in acetone (500 litres) and the mixture heated to reflux temperature for 15–20 hours; after slight cooling, ethyl acetate (550 litres) was added to the reaction mixture which was continuously stirred until cold. After filtration, washing with ethyl acetate and drying at 50–60°, N - o - bromobenzyl - N - ethyl - N,N - dimethylammonium-p-toluenesulphonate was obtained.

*Example 10*

Tablets (0.555 g.) of N-o-bromobenzyl-N-ethyl-N,N-dimethylammonium p-toluenesulphonate were made by mixing the salt (0.25 g.) in a fine powder with lactose (0.25 g.) and starch (0.05 g.), granulating the mixture with alcohol or alcohol polyvinyl pyrrolidine or a mixture of equal parts of alcohol and water, drying the granules at 40°, adding magnesium stearate (0.005 g.) as a lubricant and compressing the mixture.

*Example 11*

Tablets (0.505 g.) of N-o-bromobenzyl-N-ethyl-N,N-dimethylammonium-p-toluene sulphonate were made by granulating the salt (0.5 g.) in a fine powder with equal parts of alcohol and water. Magnesium stearate (0.005 g.) as a lubricant was added, and the mixture compressed directly.

*Example 12*

Injection solutions containing N-o-bromobenzyl-N-ethyl-N,N-dimethylammonium p-toluenesulphonate in water of injection (0.2 g. per ml.) were made by autoclaving the solution at 15 lb. steam pressure for 30 minutes in unit dose ampoules or multidose containers. For the latter, the water for injection contained benzyl alcohol (1.0%), phenol (0.5%) or chlorocresol (0.1%).

What we claim is:
1. A quaternary ammonium salt of N-o-bromobenzyl-N-ethyl-N,N-dimethylammonium cation with a therapeutically acceptable anion.
2. N - o - bromobenzyl - N - ethyl - N,N - dimethylammonium bromide.
3. N - o - bromobenzyl - N - ethyl - N,N - dimethylammonium p-toluenesulphonate.

References Cited in the file of this patent

FOREIGN PATENTS 286,984  Great Britain _____ Mar. 12, 1958

OTHER REFERENCES

Credner: "Chem. Abs.," vol. 48, p. 7785 g, 1954.
Credner et al.: "Chem. Abs.," vol. 50, p. 6683 d, 1956. (Chem. Abs. in Division 6 library.)